United States Patent Office 2,964,480
Patented Dec. 13, 1960

2,964,480

MANUFACTURE OF PLATINUM METAL-CONTAINING CATALYST

Albert B. Schwartz, Philadelphia, Pa., assignor to Socony Mobil Oil Company, Inc., a corporation of New York No Drawing. Filed May 29, 1958, Ser. No. 738,615

9 Claims. (Cl. 252—439)

This invention relates to the manufacture of catalysts. More particularly, the present invention is directed to the preparation of platinum metal-containing hydrocarbon conversion catalysts.

Catalysts containing one or more metals of the platinum series, i.e. platinum, palladium, osmium, ruthenium, iridium and rhodium have been employed in promoting, controlling and directing the course of various reactions. The above metals being relatively expensive have been used in minor amount, generally deposited on a carrier or support. The most extensive use, to date, of catalysts of the above category has been in the reforming of petroleum fractions to increase the octane number thereof. For such purpose, generally a platinum group metal deposited on an inorganic refractory oxide, such as alumina or combinations of alumina and silica, which may optionally contain minor proportions of a halogen, boria, or other component designed to impart acidity to the catalytic composite has been used.

Catalysts comprising essentially such inorganic oxide supports impregnated with between about 0.01 and about 5 weight percent and more usually between about 0.1 and about 1 weight percent of platinum metal have heretofore been prepared by bringing the inorganic oxide support into contact with a platinum metal compound, for example, chloroplatinic acid and drying the resulting mixture. Such method has been unsatisfactory since the platinum metal so deposited collects during the drying operation, in the form of agglomerates, on the surface of the support resulting in a non-homogeneous catalyst characterized by a large platinum crystallite size and low catalytic activity. In order to overcome the above disadvantage, it has heretofore been the practice to subject the solution of platinum metal compound to treatment with hydrogen sulfide or ammonium sulfide, either before or after contacting such solution with the inorganic oxide support. The platinum metal is thereby converted into the insoluble sulfide which is incapable of migrating during the drying step. Such method, however, has been accompanied by certain inherent disadvantages, one of which is the release of highly toxic hydrogen sulfide to the atmosphere. Another disadvantage resides in the fact that with an aqueous solution of platinum compound, the concentration of platinum must be controlled below about 0.7 gram per liter before contacting with hydrogen sulfide in order to avoid immediate precipitation of platinum sulfide. The use of concentrated impregnating solutions is thus eliminated and careful control must be exercised when working in the vicinity of the above noted concentration in order to forestall premature precipitation and agglomeration of the platinum metal sulfide.

A further disadvantage is that with the use of hydrogen or ammonium sulfide treating solutions, sulfiding may take place in an extremely short interval of time in localized areas where the sulfur-containing component makes initial contact with the solution of platinum metal compound, thereby defeating the achievement of uniform distribution of platinum metal on the support due to the non-uniform dispersion of platinum metal sulfide with the accompanying formation of large crystallites of platinum metal.

In accordance with the present invention, there has now been discovered an improved method for preparing a catalytically active platinum metal deposit of small crystal size on an inorganic refractory oxide. The method of the invention overcomes the disadvantages inherent in the above-noted procedures and affords a method for producing platinum-containing catalysts of high stability, selectivity and activity useful in the conversion of hydrocarbon fractions, such as the reforming of gasoline fractions to produce products of enhanced octane number. The method of the invention, is further applicable for sulfiding solutions of platinum compounds in which platinum may be present in concentrations greatly in excess of the above-noted limit of 0.7 gram per liter without encountering premature precipitation of platinum metal sulfide.

It is accordingly an object of the present invention to provide an improved method for the manufacture of catalysts containing one or more of the platinum group metals. Another object is the provision of a platinum-containing catalyst of high stability, selectivity and activity for the conversion of hydrocarbons, particularly in hydrogenation, dehydrogenation, isomerization, hydrocracking and reforming reactions. A still further object of the invention is to provide a method for effecting uniform distribution of a platinum metal on an inorganic oxide support leading to a resulting homogeneous, catalytic composite of small platinum metal crystallite size.

The above and other objects which will be apparent to those skilled in the art are achieved in accordance with the present invention. Broadly, the method of the invention involves sulfiding the platinum metal by contacting in aqueous media with a sulfur-containing compound which hydrolyzes slowly releasing hydrogen sulfide. The sulfur-containing compound employed is one in which the sulfur atom is attached to a carbon atom by one or more covalent bonds, i.e. the sulfur-carbon bond is nonionic, affording upon contact with water, slow hydrolysis with liberation of sulfide ions at a controlled rate. The sulfur-containing compounds employed are non-basic, i.e. they have a $pKa \leq 2$ as defined in Industrial and Engineering Chemistry, vol. 44, page 2601, November 1952 in the paper entitled "Distribution of Nitrogen in Petroleum According to Basicity," by Richter et al. The sulfur-containing compounds employed in the process of this invention are particularly characterized by a structure

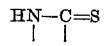

These compounds are to be distinguished from sulfur-containing salts such as ammonium sulfide and substituted derivatives thereof which are ionic basic nitrogen compounds having high ionization constants and which, upon contact with water, release sulfide ions rapidly and at an uncontrolled rate.

The compounds employed in the process of the invention are particularly designated by the following formula:

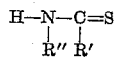

where R' may be —NH$_2$,

alkyl or aryl groups and R'' may be hydrogen, alkyl, or aryl groups. Representative compounds include, for example, thiourea, thioacetamide and thiocarbanilid. While not essential, it is desirable that the sulfur-containing compounds of the above-indicated type be soluble in water. Thus, for example, while a water-insoluble organic sulfur compound of the above type may be agitated with an aqueous solution of platinum metal compound as a separate phase to accomplish sulfiding, it is preferred that the particular sulfur-containing compound employed be characterized by a substantial solubility in water. On this basis, thioacetamide and derivatives thereof may be considered as a preferred source of sulfide ions. The rate of hydrolysis of the sulfur-containing compound can be readily controlled by adjustment of the temperature. For example, a stable solution of the above designated sulfur-containing compound may be prepared at room temperature or lower. After mixing with an aqueous solution of platinum metal compound, sulfiding of the platinum metal takes place slowly at room temperature or more rapidly if the solution is heated. A uniform dispersion of platinum sulfide is thereby obtained leading upon subsequent drying and calcining to the formation of desired small crystallites of platinum metal.

Hydrolysis of the sulfur-containing compound, together with formation of platinum metal sulfide, may take place either in the presence or absence of the inorganic refractory oxide support upon which it is desired to deposit the platinum metal. In the latter case, the sulfur-containing compound is initially mixed in aqueous media with a platinum metal-containing compound and the resulting mixture is thereafter brought into contact with the inorganic refractory oxide support. Such support having a platinum metal sulfide uniformly dispersed thereon is thereafter dried and calcined at an elevated temperature. In the event that hydrolysis of the sulfur-containing compound has not been completed, prior to the drying step, the elevated temperature encountered during such latter step will serve to expedite the desired hydrolysis.

Thus, in accordance with the process of the present invention, a platinum compound such as an aqueous solution of chloroplatinic acid is contacted with a non-ionic, non-basic, sulfur-containing compound capable of slow hydrolysis and liberation of sulfide ions at a controlled rate. The platinum is thereby converted into a stable dispersion of platinum sulfide. As noted hereinabove, the formation of such dispersion may take place in the presence of an inorganic refractory oxide support or, after separate formation of the dispersion, the same may subsequently be contacted with an inorganic refractory oxide support. The mixture obtained in either case is dried and calcined. A catalyst of an inorganic refractory oxide impregnated with a homogeneous uniform deposition of platinum is thereby obtained. Such catalyst is characterized by high activity, selectivity and stability in hydrocarbon conversion reactions, such as the reforming of petroleum hydrocarbons boiling in the gasoline range.

The particular amount of sulfur-containing compound employed is dependent generally upon the concentration of platinum compound utilized. Usually, the sulfur-containing compound will be present in sufficient concentration so that at least an equimolar proportion of sulfur to platinum is contained in the sulfiding solution. Generally, the molar ratio of sulfur to platinum contained in such solution will be between about 2:1 and 10:1.

It is contemplated that any water soluble platinum metal compound capable of being converted into a platinum metal sulfide by contact with sulfide ions may be used in preparation of the present catalyst. Representative compounds of platinum include platinum tetrachloride, chloroplatinic acid, derivatives thereof with halogens and the like. When other metals of the platinum series are employed, corresponding compounds of such metals will be used.

The inorganic refractory oxide support used in the present method of catalyst preparation is generally alumina or composites of silica and at least one oxide of an element from Groups II-A, III-B, or IV-A of the Mendeléeff Periodic Table. Thus, the inorganic refractory oxide support may be alumina, silica, silica-alumina, silica-zirconia, silica-alumina-zirconia, silica-magnesia, silica-alumina-thoria, and silica-alumina-magnesia as well as activated siliceous clays. The inorganic oxide support may be activated with a halogen, particularly fluorine or chlorine prior to impregnation. The inorganic oxide support may be prepared by any of a variety of methods well known in the art. Thus, an alumina base may be prepared by precipitation from an aqueous solution of aluminum chloride, aluminum sulfate, aluminum nitrate or other salt by the addition thereto of ammonium hydroxide or an alkali compound. The alumina base may also be prepared by acidification of sodium aluminate or other soluble aluminate. Also, the alumina base may be prepared by reaction of pure aluminum metal with water in the presence of mercury or a mercury compound. Composites of silica-alumina, or composites of silica with other of the above-noted oxides may be prepared by methods well known in the art employing cogelation or impregnation techniques. Thus, taking the preparation of silica-alumina composites as a typical example, cogels of silica and alumina may be prepared by intimately admixing an acidic solution of an aluminum salt with sodium silicate to yield a silica-alumina hydrosol which sets after lapse of a suitable period of time to a hydrogel. The resulting hydrogel is thereafter base exchanged to remove zeolitic sodium, water-washed, dried preferably in superheated steam and finally calcined at 900° F. to 1400° F. in air. Alternatively, a silica-alumina composite may be produced by separately forming a hydrogel or gelatinous precipitate of silica and a hydrogel or gelatinous precipitate of alumina and ball milling or otherwise intimately admixing the silica and alumina together to yield a resultant silica-alumina composite. In such instances, the silica is suitably prepared by mixing an acid solution, for example an aqueous sulfuric acid solution, with sodium silicate. If it is desired to prepare silica initially free of alkali metal ions such may be accomplished by effecting hydrolysis of alkyl silicates i.e. ethyl silicate. Alumina is readily prepared by the addition of ammonium or alkali metal hydroxide to an aqueous aluminum salt solution for example an aluminum salt of a mineral acid such as aluminum nitrate, aluminum chloride or aluminum sulfate. As another alternate procedure for preparing the silica-alumina composite, a synthetic silica gel or precipitate may be prepared in accordance with one of the foregoing processes and alumina may be deposited thereon by contacting the silica gel or precipitate with an aqueous aluminum salt solution followed by the addition of a sufficient amount of ammonium hydroxide to effect precipitation of alumina on the silica. The composite of silica and alumina can further be prepared by contacting a preformed silica gel with an aqueous aluminum salt solution thereafter removing the impregnated silica gel from the solution and heating to a sufficiently elevated temperature to decompose the aluminum salt laid down by impregnation to alumina so that the resulting product is silica impregnated with alumina. All of the foregoing methods for preparing composites of silica and alumina are well known in the art and are referred to herein merely as illustrative of suitable preparation procedures.

It will be realized that composites of other oxides than silica and alumina and composites of more than two oxides, may with suitable modification, likewise be prepared in accordance with the general procedure above outlined.

Halogen may be added to the inorganic oxide support, if desired, in any suitable manner and either before or after precipitation or gelation of the oxide. While the halogen may be used as such, it is generally preferred to utilize the halogen or an aqueous solution of the hydrogen halide for ease in handling. It is usually preferred to add the halogen to the refractory oxide before the other components are composited therewith. When alumina is the refractory oxide, the halogen is preferably incorporated into the alumina before forming into particles and such may be accomplished by the use of an acid such as hydrogen fluoride, hydrogen chloride, hydrogen bromide and/or hydrogen iodide. In some instances, volatile salts such as ammonium fluoride, ammonium chloride, etc. may be employed. The amount of halogen, when added, is generally in the range of from about 0.1% to about 10% by weight of the final catalyst. Chemically combined fluorine, being more active, will ordinarily be used in the range of from about 0.1 percent to about 5 percent by weight of the refractory oxide on a dry basis. The chlorine content will generally be within the range of from about 0.1 percent to about 8 percent and preferably from about 0.2 percent to about 5 percent by weight of the final catalyst on a dry basis. The halogen may comprise a mixture of two or more halogens and the total amount of halogen will generally be within the ranges set forth herein.

It is to be understood that the various combinations of components which may be prepared and used in accordance with the present invention are not necessarily equivalent. In general, the fractory oxide or mixture of the oxides will comprise a major proportion of the catalyst and range from about 85 percent to about 99.99 percent by weight of the catalyst composite. The concentration of the metal of the platinum series will generally be in the approximate range of 0.01 percent to 5 percent by weight and more usually between about 0.1 percent and about 1 percent by weight of the catalyst. It is understood that when desired two or more metals of the platinum series may be utilized in the catalyst composite.

Of the aforementioned inorganic refractory oxides, alumina has been known to impart stability to the platinum metal in subsequent aging thereby permitting use of the catalyst over an extended period of time in hydrocarbon conversion operations without necessitating regeneration. Accordingly, alumina is, for present purposes, considered to be the preferred inorganic oxide support. Such alumina may be combined with minor proportions of promoting agents such as halogens, boria and the like. The inorganic refractory oxide support employed desirably has a surface area greater than about 10 square meters per gram and preferably in excess of 30 square meters per gram and may extend up to 500 square meters per gram or more. The term "surface area" as used herein designates the surface area of the inorganic oxide carrier as determined by the adsorption of nitrogen according to the method of Brunnauer et al., Journal American Chem. Soc. 60, 309, et seq. (1938).

The rate of hydrolysis of the sulfur-containing compound employed will depend on the particular compound as well as upon the temperature at which hydrolysis is effected. It is preferred to carry out the hydrolysis at ordinary temperatures although it will be realized that in some instance, it may be desirable to carry out the desired hydrolysis at a somewhat lower temperature or at a higher temperature to thereby control the rate of hydrolysis. Usually, the desired hydrolysis reaction will exceed about ¼ hour and will generally extend over a period of from about ½ hour to about 24 hours or longer. It is ordinarily preferred to control the rate of hydrolysis so that not more than about 7 grams of hydrogen sulfide are released per gram of platinum per hour and as utilized herein the term "slow hydrolysis" has such significance.

After contact of the inorganic oxide support with the produced dispersion of platinum sulfide, the resulting mixture is dried at a temperature between about 150° F. and about 400° F. for a period of between about 1 and about 24 hours. The dried composite is then calcined at a temperature between about 800 and about 1200° F. for about 2 to about 10 hours in air. If desired, the catalyst mixture may be contacted with hydrogen or a hydrogen-containing gas after calcining. Alternatively, the calcining step may be carried out in the presence of hydrogen or a hydrogen-containing gas. It will also be understood that calcining treatment may be effected during utilization of the catalyst for hydrocarbon conversion at elevated temperatures within the aforementioned approximate range of 800 to 1200° F.

The catalyst may be prepared in any desired form depending upon the specific process for which it is intended. Thus, the catalyst may be in the form of a fine powder for use in a fluid type process or the catalyst may be formed into pellets or particles of other suitable shape, generally prior to the calcination step. The particles may be formed into spheroidal particles employing well known bead forming techniques such as those described by Marisic in U.S. 2,384,946. Alternatively, the catalyst after drying may be ground to a fine particle size mixed with a lubricant such as stearic acid, rosin, graphite or the like, and subjected to extrusion to form particles of desired size by methods well known to the art, after which the formed particles may be calcined as described above.

The catalysts described herein are useful in hydrocarbon conversion reactions which are catalyzed by metals of the platinum groups. Thus, the catalysts prepared in accordance with the present process are useful for reforming, isomerization, hydrogenation, dehydrocyclization, polymerization, hydrocracking, oxidation, desulfurization, dehydrogenation, and other hydrocarbon conversion processes. As will be realized, the processing conditions will depend upon the specific reactions involved as well as the charge stock employed. It is contemplated that the catalyst produced in accordance with the present process will be used in the aforesaid conversion reactions under substantially the same process conditions as have heretofore been described in the art.

Thus, considering reforming as a typical hydrocarbon conversion process in which catalysts produced in accordance with the present method may be employed, such process is generally carried out at a temperature between about 700° F. and 1000° F. and preferably at a temperature between about 800° F. and 975° F. The pressure during reforming is generally within the range of about 100 to about 1000 p.s.i.g. and preferably between about 200 and about 700 p.s.i.g. The liquid hourly space velocity employed, i.e. the liquid volume of hydrocarbon per hour per volume of catalyst is between about 0.1 and about 10 and preferably between about 0.5 and about 4. In general, the molar ratio of hydrogen to hydrocarbon charge employed is between about 1 and about 20 and preferably between about 4 and about 12. Hydrocarbon charge stocks subjected to reforming generally comprise mixtures of hydrocarbons and particularly petroleum distillates boiling within the approximate range of 60° F. to 450° F. which range includes napthas, gasolines, and kerosene. The gasoline fraction may be a full boiling range gasoline. It is, however, generally preferred to use a selected fraction such as naptha having an initial boiling point of between about 150° F. and about 250° F. and an end boiling point of between about 350° F. and about 425° F.

The following illustrative and comparative examples will serve to illustrate the method of the invention without limiting the same:

*Examples 1–3*

Three platinum-alumina catalysts were prepared using hydrogen sulfide, thioacetamide and thiourea respectively as sulfiding agents.

In preparation of these catalysts, an alumina support was initially formed by reaction of 327 grams of pure aluminum metal turnings with a solution containing 1.54 grams $HgCl_2$ in 9.3 liters of water for 141 hours at a temperature of about 70° F. Ninety-seven percent of the aluminum was converted at the end of this period into alumina. Unreacted aluminum was removed from the reaction product. The resulting aqueous slurry of alumina was filtered to give a hydrated precipitate containing, on a dry basis, 22.9 weight percent solids. An aqueous solution of chloroplatinic acid (140 ml. H₂O/gram Pt) was mixed with the precipitate to provide 0.35 percent by weight platinum based on the dry alumina. The resulting mixture was then divided into three equal parts.

In Example 1, one part of the above alumina-chloroplatinic acid mixture was contacted with a solution of water saturated with hydrogen sulfide. Sufficient hydrogen sulfide was present to provide 0.77 gram H₂S per gram of platinum. The resulting composite was agitated for ½ hour.

In Example 2, a second part of the above alumina chloroplatinic acid mixture was contacted with an aqueous solution of thioacetamide, present in an amount sufficient to provide 0.77 gram H₂S per gram of platinum. The resulting composite was agitated for ½ hour.

In Example 3, the third part of the above alumina-chloroplatinic acid mixture was contacted with an aqueous solution of thiourea, present in an amount sufficient to provide 0.77 gram H₂S per gram of platinum. The resulting composite was agitated for ½ hour.

All three of the above samples were then dried in air for 16 hours at a temperature of 240° F. Each of the dried catalyst samples were then ground to a particle size of less than 325 mesh (Tyler). Water was then added in each case to form a mixture of extrudable consistency and each of the three catalyst samples were extruded into particles of 1/16 inch diameter and cut into lengths of about ¼ inch. The extruded particles, in each instance, were dried at 240° F. The catalyst samples were then slowly heated in air to 925° F. and held at that temperature for 2 hours, then purged in nitrogen for ½ hour, thereafter treated with hydrogen for ½ hour at 925° F. and finally cooled in an atmosphere of nitrogen.

The catalysts of Examples 1 and 2 were tested for activity by reforming a Mid-Continent naptha, having an approximate boiling range of 200–380° F. to 98 octane number (Research + 3 cc. TEL). The reforming was carried out at a pressure of 500 pounds per square inch gauge; a liquid hourly space velocity of 2, and a hydrogen to hydrocarbon mol ratio of 10. The test results are set forth below:

| Sulfiding Agent | Example 1, Hydrogen Sulfide | Example 2, Thioacetamide |
|---|---|---|
| Naphtha inlet temp. required to produce 98 octane reformate, ° F | 907 | 906 |

The three catalysts of Examples 1, 2 and 3 were analyzed for chemical composition and physical properties. The results of such analyses are shown below:

| Sulfiding Agent | Example 1, Hydrogen Sulfide | Example 2, Thioacetamide | Example 3, Thiourea |
|---|---|---|---|
| Catalyst properties— Chemical composition, percent weight: | | | |
| Pt | 0.35 | 0.35 | 0.38 |
| Cl | 0.43 | 0.41 | 0.48 |
| S | 0.18 | 0.20 | 0.22 |
| Physical Properties: | | | |
| Density, g./cc | 0.75 | 0.78 | 0.75 |
| Surface area, sq.m./g | 335 | 338 | 342 |

It will be seen from the above results that the reforming activity, as measured by the temperature required to produce 98 octane number reformate, of the catalyst produced using a sulfiding agent of thioacetamide was at least equal and in fact slightly better than the conventionally produced catalyst using a sulfiding agent of hydrogen sulfide. Likewise, it will be noted that the chemical and physical properties of the catalysts obtained using sulfiding agents of thioacetamide and thiourea were substantially the same as those of the catalyst obtained using the sulfiding agent of hydrogen sulfide. In addition, the catalysts produced using thioacetamide and thiourea had the highly desirable advantage of avoiding the hazards attributable to the use of toxic hydrogen sulfide.

It will be understood that in place of thioacetamide and thiourea, other of the above noted non-ionic sulfur-containing compounds capable of slow hydrolysis and liberation of sulfide ion at a controlled rate may be employed as sulfiding agents in the catalyst preparation method described herein. Accordingly, it is to be understood that the above description is merely illustrative of preferred embodiments of the invention, of which many variations may be made within the scope of the following claims by those skilled in the art without departing from the spirit thereof.

I claim:

1. A method of manufacturing a catalyst which comprises bringing an inorganic refractory oxide support into contact with an aqueous solution of a platinum compound and a non-ionic, non-basic, sulfur-containing compound characterized by the formula:

$$\begin{array}{c} H-N-C=S \\ | \quad | \\ R'' \quad R' \end{array}$$

where R′ is selected from the group consisting of —NH₂,

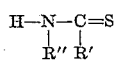

alkyl and aryl groups and R″ is selected from the group consisting of hydrogen, alkyl and aryl groups whereby a uniform dispersion of platinum sulfide is obtained upon slow, temperature-controllable hydrolysis of said sulfur-containing compound and drying and calcining the resulting catalytic mixture.

2. A method of manufacturing a catalyst which comprises bringing an alumina support into contact with an aqueous solution of a platinum compound and a non-ionic, non-basic, sulfur-containing compound characterized by the formula:

$$\begin{array}{c} H-N-C=S \\ | \quad | \\ R'' \quad R' \end{array}$$

where R′ is selected from the group consisting of —NH₂,

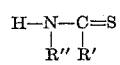

alkyl and aryl groups and R″ is selected from the group consisting of hydrogen, alkyl and aryl groups whereby a uniform dispersion of platinum sulfide is obtained upon slow, temperature-controllable hydrolysis of said sulfur-containing compound and drying and calcining the resulting catalytic mixture.

3. A method of manufacturing a catalyst which comprises bringing halogen-containing alumina into contact with an aqueous solution of a platinum compound and a non-ionic, non-basic, sulfur-containing compound characterized by the formula:

$$\begin{array}{c} H-N-C=S \\ | \quad | \\ R'' \quad R' \end{array}$$

where R′ is selected from the group consisting of —NH₂,

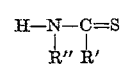

alkyl and aryl groups and R″ is selected from the group consisting of hydrogen, alkyl and aryl groups whereby a uniform dispersion of platinum sulfide is obtained upon slow, temperature-controllable hydrolysis of said sulfur-containing compound and drying and calcining the resulting catalytic mixture.

4. A method of manufacturing a catalyst which comprises bringing an inorganic refractory oxide support into contact with an aqueous solution of chloroplatinic acid and a non-ionic, non-basic, sulfur-containing compound characterized by the formula:

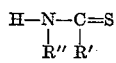

where R' is selected from the group consisting of $-NH_2$,

alkyl and aryl groups and R" is selected from the group consisting of hydrogen, alkyl and aryl groups whereby a uniform dispersion of platinum sulfide is obtained upon slow, temperature-controllable hydrolysis of said sulfur-containing compound and drying and calcining the resulting catalytic mixture.

5. A method of manufacturing a catalyst which comprises bringing alumina into contact with an aqueous solution of chloroplatinic acid and a non-ionic, non-basic, sulfur-containing compound characterized by the formula:

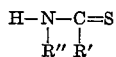

where R' is selected from the group consisting of $-NH_2$,

alkyl and aryl groups and R" is selected from the group consisting of hydrogen, alkyl and aryl groups whereby a uniform dispersion of platinum sulfide is obtained upon slow, temperature-controllable hydrolysis of said sulfur-containing compound and drying and calcining the resulting catalytic mixture.

6. A method of manufacturing a catalyst which comprises bringing an inorganic refractory oxide support into contact with an aqueous solution of a platinum compound and thioacetamide whereby a uniform dispersion of platinum sulfide is obtained upon slow hydrolysis of said thioacetamide and drying and calcining the resulting catalytic mixture.

7. A method of manufacturing a catalyst which comprises bringing alumina into contact with an aqueous solution of chloroplatinic acid and thioacetamide whereby a uniform dispersion of platinum sulfide is obtained upon slow hydrolysis of said thioacetamide and drying and calcining the resulting catalytic mixture.

8. A method of manufacturing a catalyst which comprises bringing an inorganic refractory oxide support into contact with an aqueous solution of a platinum compound and thiourea whereby a uniform dispersion of platinum sulfide is obtained upon slow hydrolysis of said thiourea and drying and calcining the resulting catalytic mixture.

9. A method of manufacturing a catalyst which comprises bringing alumina into contact with an aqueous solution of chloroplatinic acid and thiourea whereby a uniform dispersion of platinum sulfide is obtained upon slow hydrolysis of said thiourea and drying and calcining the resulting catalytic mixture.

References Cited in the file of this patent

UNITED STATES PATENTS

| | | |
|---|---|---|
| 2,623,860 | Haensel | Dec. 30, 1952 |
| 2,659,701 | Heard | Nov. 17, 1953 |